US007010216B2

(12) United States Patent
Koike et al.

(10) Patent No.: US 7,010,216 B2
(45) Date of Patent: *Mar. 7, 2006

(54) DATA RECORDING AND REPRODUCING APPARATUS HAVING A DATA TRANSFER DEVICE SELECTIVELY TRANSFERRING DATA BETWEEN MULTIPLE DATA RECORDING AND REPRODUCING DEVICES

(75) Inventors: Shigeaki Koike, Kanagawa (JP); Yasuo Iwasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/072,950

(22) Filed: Mar. 4, 2005

(65) Prior Publication Data

US 2005/0147381 A1  Jul. 7, 2005

Related U.S. Application Data

(63) Continuation of application No. 08/563,188, filed on Nov. 27, 1995, now Pat. No. 6,888,998.

(30) Foreign Application Priority Data

Nov. 28, 1994  (JP) ............................. P06-293556

(51) Int. Cl.
 *H04N 5/93* (2006.01)
(52) U.S. Cl. ........................... 386/52; 386/68; 386/80; 386/125; 386/126

(58) Field of Classification Search .................. 386/46, 386/52, 55, 68, 125–126, 77, 80
See application file for complete search history.

(56) References Cited

U.S. PATENT DOCUMENTS

| 4,974,178 | A | * | 11/1990 | Izeki et al. | 386/7 |
|---|---|---|---|---|---|
| 5,164,839 | A | * | 11/1992 | Lang | 386/54 |
| 5,206,929 | A | * | 4/1993 | Langford et al. | 386/55 |
| 5,218,672 | A | * | 6/1993 | Morgan et al. | 386/55 |
| 5,367,341 | A | * | 11/1994 | Schnorf | 386/55 |
| 5,432,769 | A | * | 7/1995 | Honjo | 386/46 |
| 5,526,132 | A | * | 6/1996 | Tsubota et al. | 385/52 |
| 6,888,998 | B1 | * | 5/2005 | Koike et al. | 386/52 |

* cited by examiner

*Primary Examiner*—Vincent Boccio
(74) *Attorney, Agent, or Firm*—Bell, Boyd & Lloyd LLC

(57) ABSTRACT

A data recording and reproducing apparatus which can easily perform the editing of audio and/or visual data even at the camera site. In the data recording and reproducing apparatus, a VTR portion and an MO disc portion are integrally constituted. Audio and/or visual data input from an outside apparatus is recorded on a video tape by the VTR portion, and further reproduced from the video tape and transferred to the MO disc device at a high speed and recorded. The user of the data recording and reproducing apparatus quickly finds the desired video image by actively utilizing the random access property of the MO disc device and sequentially inputs the same to the VTR device, records the same on the video tape, and performs the editing of the audio and/or visual data.

2 Claims, 6 Drawing Sheets

DATA RECORDING AND REPRODUCING APPARATUS HAVING A DATA TRANSFER DEVICE SELECTIVELY TRANSFERRING DATA BETWEEN MULTIPLE DATA RECORDING AND REPRODUCING DEVICES

CROSS REFERENCE TO RELATED APPLICATIONS

The present application is a continuation of U.S. patent application Ser. No. 08/563,188, filed on Nov. 27, 1995 now U.S. Pat. No. 6,888,998, the disclosure of which is herein incorporated by reference.

BACKGROUND OF THE INVENTION

1. Field of the Invention

The present invention relates to a data recording and reproducing apparatus which records and reproduces a digital audio and/or visual (video) signal.

2. Description of the Related Art

In general, for editing work of video data, audio data, etc., there has been adopted the method of connecting a plurality of VTR apparatuses (video tape recorders), reproducing the video data etc. by the respective VTR apparatuses to find the required video images, and connecting the located plurality of video data to one video data.

When the editing of the video data is carried out by using the above-mentioned method, however, it suffers from the disadvantages that the VTR apparatus can perform basically only a sequential access and, in addition, a long time is taken for the editing work since the data transfer rate when a plurality of video data are connected to one video data is restricted by the reproduction data rate of the VTR apparatus.

Further, there has been a demand for enabling editing of the video data etc. at the site where news was shot. However, sometimes it is not possible to provide a number of VTR devices at the camera site and therefore it is not possible to meet this demand in many cases. On the other hand, even if a plurality of VTR devices can be provided, it greatly reduces the mobility of the news crew it they have to carry a plurality of VTR devices together with the camera equipment.

Moreover, also in a case where the edited video data etc. are to be transferred, it suffers from the disadvantages that the transmission data rate is restricted by the reproduction data rate of the VTR device, the transmission can be carried out only with a low transmission data rate, and the method of transmission of the video data from the camera site to the broadcast station is restricted. It is not impossible to change the reproduction data rate of the VTR device to any value in accordance with the transmission data rate. However, it suffers from the disadvantage in that such a VTR device would have to be a special one which has a more complex structure than the usual VTR device and is more expensive in cost.

SUMMARY OF THE INVENTION

The present invention was made in consideration with the above-mentioned disadvantages of the related art and has as an object thereof to provide a data recording and reproducing apparatus which does not require a plurality of VTR devices for performing the editing work of video data and can easily perform the editing of the video data even at the camera site.

Another object of the present invention is to provide a data recording and reproducing apparatus which has a simple structure and is inexpensive in cost while making the reproduction data rate variable.

Still another object of the present invention is to provide a data recording and reproducing apparatus in which the recording and reproduction data rate and the transmission data rate are variable and which can enhance the efficiency of the editing work by improving the transfer data rate when a plurality of video data are connected to one video data.

Moreover, another object of the present invention is to provide a data recording and reproducing apparatus which can transmit the video data obtained as a result of editing at a plurality of transmission data rates and has little restrictions in the method of transmission.

So as to achieve the above-mentioned objects, the data recording and reproducing apparatus of the present invention is characterized in that a disc recording and reproducing means, a tape recording and reproducing means, a data transfer means, a first input/output means, and a second input/output means are integrally assembled; the disc recording and reproducing means records audio and/or visual data including audio-data, and video-data, audio-data or video-data, i.e. audio and/or visual data, transferred from the data transfer means in a disc recording medium to which random access is possible and reproduces the audio and/or visual data from the disc recording medium and outputs the same to the data transfer means; the tape recording and reproducing means records the audio and/or visual data transferred from the data transfer means in the tape recording medium and reproduces the audio and/or visual data from the tape recording medium and outputs the same to the data transfer means; the data transfer means transfers the audio and/or visual data among any of the elements selected from among the disc recording and reproducing means, the tape recording and reproducing means, the first input/output means, and the second input/output means; the first input/output means receives an analog audio and/or visual signal from an outside apparatus, converts the same to audio and/or visual data of a digital format, and outputs the same to the data transfer means and converts the audio and/or visual data transferred from the data transfer means to an audio and/or visual signal of the analog format and outputs the same to an outside apparatus; and the second input/output means receives audio and/or visual data from a communication line connected to an outside apparatus and outputs the same to the data transfer means and outputs the audio and/or visual data transferred from the data transfer means to a communication line connected to an outside apparatus.

The disc recording and reproducing means is for example a magneto-optic (MO) disc device and records and reproduces the audio and/or visual data with respect to a disc recording medium such as an MO disc medium to which random access is possible.

The tape recording and reproducing means is for example a VTR device and records and reproduces the audio and/or visual data with respect to the tape recording medium such as a video tape recording medium to which substantially only a sequential access at a plurality of reproduction data rates is possible.

The data transfer means transfers the audio and/or visual data in any direction among a disc recording and reproducing means, the tape recording and reproducing means, and the input/output means, that is, for example, a direction from the disc recording and reproducing means to the tape recording and reproducing means and an inverse direction thereof and a direction from the disc recording and reproducing means to the tape recording and reproducing means and the input/output means and, at the same time, adjusts the timing of input/output of the audio and/or visual data among them.

The first input/output means converts audio and/or visual data transferred from the data transfer means to an audio and/or visual image signal of an analog format and outputs the same to an outside apparatus and converts an audio and/or visual image signal received from an outside apparatus to digital audio and/or visual data and outputs the same to the data transfer means.

The second input/output means transmits or receives the audio and/or visual data between the data transfer means and a predetermined digital communication line.

In the data recording and reproducing apparatus according to the present invention, by accommodating these constituent parts in one housing, the portability is enhanced and the usefulness at the location of voice and video images is enhanced.

Preferably, the disc recording and reproducing means records audio and/or visual data which was reproduced from the tape recording medium by the tape recording and reproducing means and transferred by the data transfer means and the audio and/or visual data which was received by the first input/output means and the second input/output means and transferred by the data transfer means in the disc recording medium and the tape recording and reproducing means records the audio and/or visual data which was reproduced from the disc recording medium by the disc recording and reproducing means and the audio and/or visual data which was received by the first input/output means and the second input/output means and transferred by the data transfer means in the tape recording medium.

Preferably, the data transfer means has an input buffering means performing the buffering of the audio and/or visual data input from the disc recording and reproducing means; an output buffering means performing the buffering of the audio and/or visual data which is transferred to the disc recording and reproducing means; and a recording and reproduction control means controlling each of the reproduction operation and recording operation of the disc recording and reproducing means in accordance with respective remaining recording capacities of the input buffering means and the output buffering means.

Preferably, the recording and reproduction control means starts the reproduction operation of the disc recording and reproducing means where the remaining storage capacity of the input buffering means becomes larger than a predetermined value and stops the reproduction operation of the disc recording and reproducing means where the remaining storage capacity of the input buffering means becomes a predetermined value or less.

Preferably, the tape recording means reproduces the audio and/or visual data at the data rate with which the data transfer means receives the audio and/or visual data and records the audio and/or visual data at the data rate with which the data transfer means transfers the audio and/or visual data.

Preferably, the first input/output means has a digital/analog conversion means for converting the audio and/or visual data of a digital format from the data transfer means to an audio and/or visual signal of an analog format and outputting the same to an outside apparatus and an analog/digital conversion means for converting an audio and/or visual signal of an analog format from an outside apparatus to audio and/or visual data of a digital format and outputting the same to the data transfer means.

Preferably, the second input/output means has a data output means for converting audio and/or visual data of a parallel format from the data transfer means to audio and/or visual data of a serial format and outputting the same to a predetermined communication line of the outside apparatus and a data reception means for receiving audio and/or visual data of a serial format from a predetermined communication line of an outside apparatus and converting the same to audio and/or visual data of a parallel format and outputting the same to the data transfer means.

BRIEF DESCRIPTION OF THE DRAWINGS

The above and other objects and features of the present invention will be more apparent with reference to the accompanying drawings, in which.

DETAILED DESCRIPTION OF THE PREFERRED EMBODIMENTS

First Embodiment

A first embodiment of the present invention will be explained.

Figure 1:
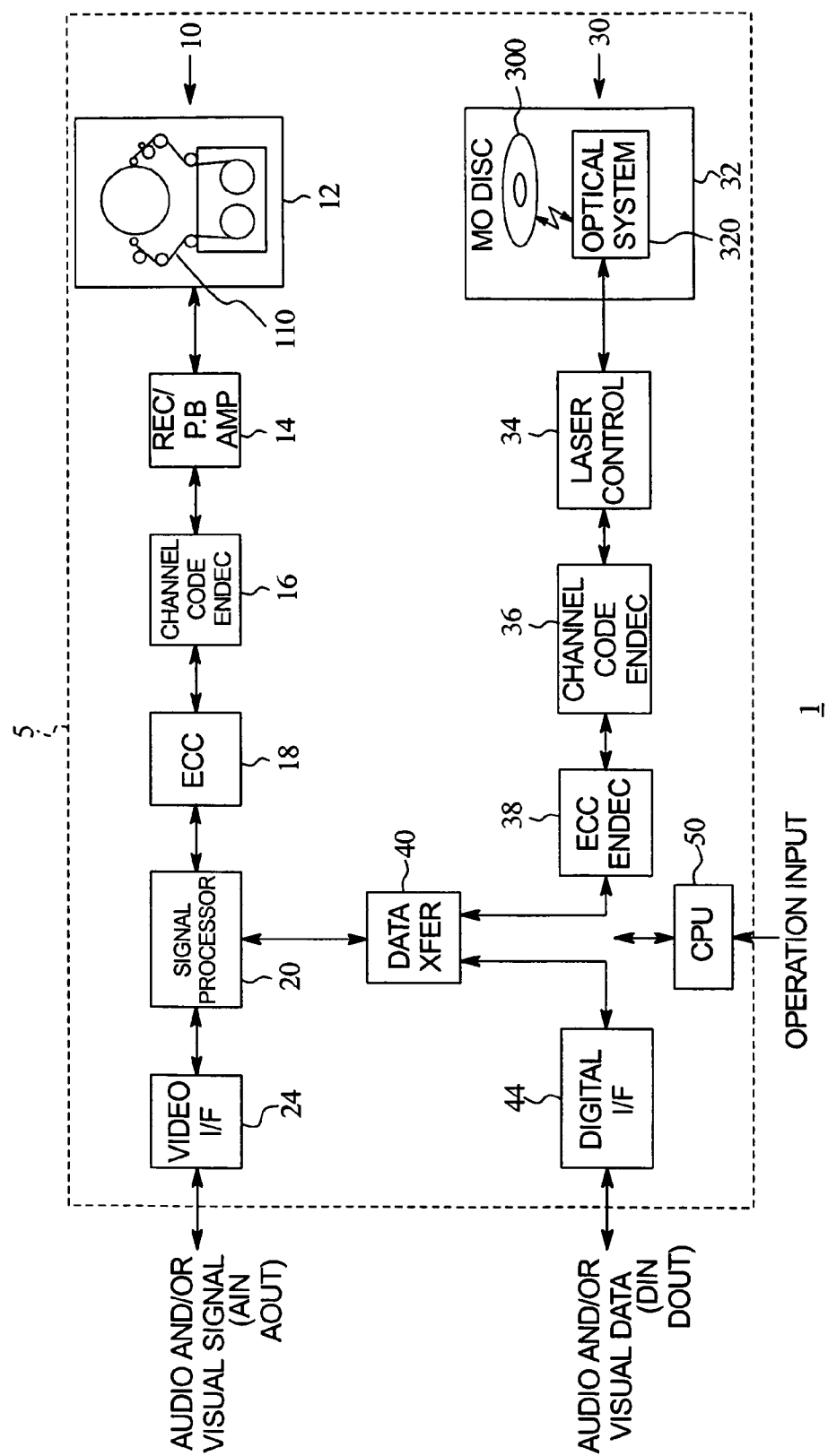
FIG. 1 is a view showing the configuration of a data recording and reproducing apparatus according to the present invention.

FIG. 1 is a view showing the configuration of a data recording and reproducing apparatus 1 according to the present invention.

Figure 2:
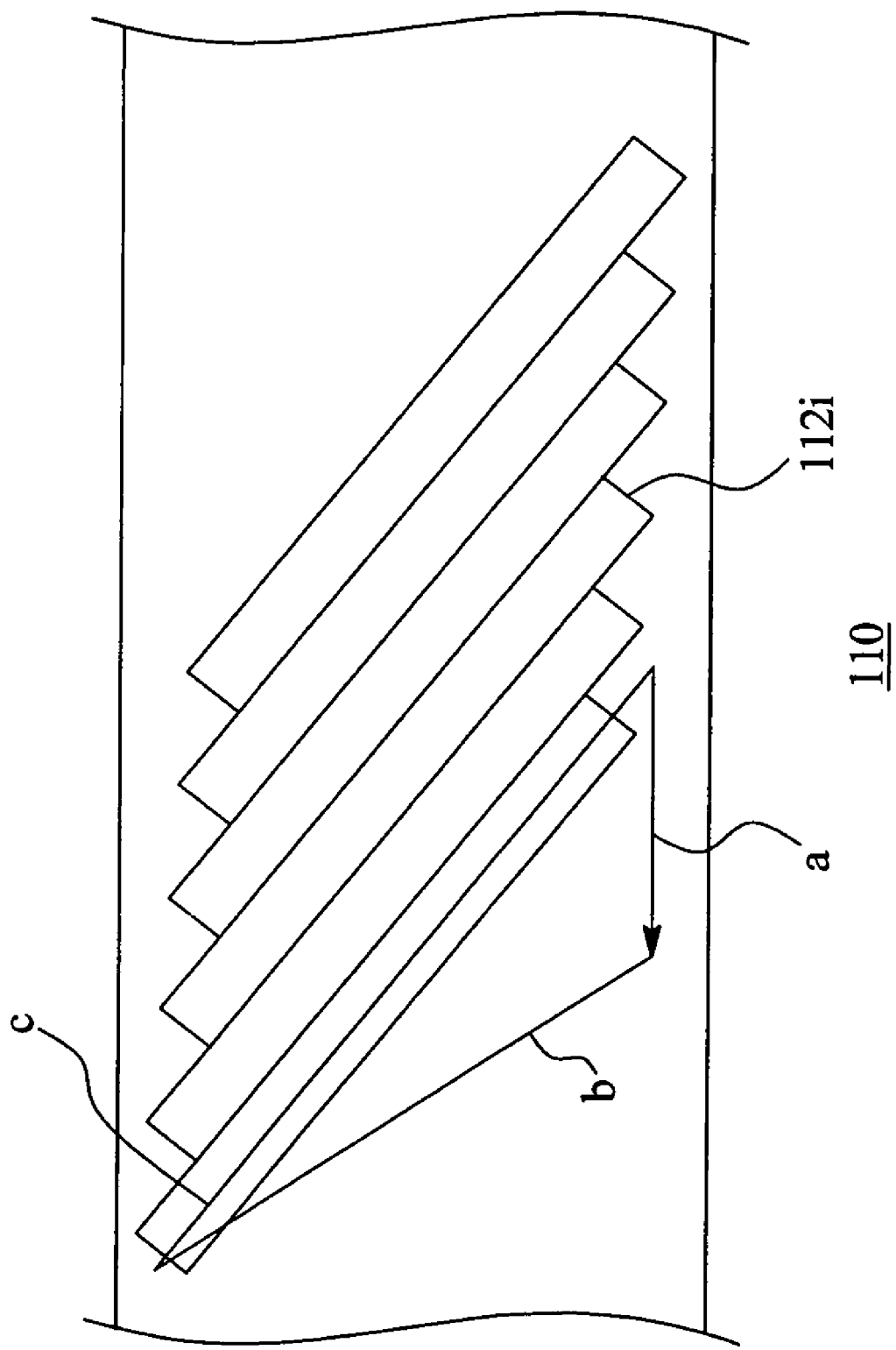
FIG. 2 is a view showing a recording track on a video tape shown in FIG. 1.

FIG. 2 is a view showing a recording track $112_i$ (i is an integer) on a video tape 110 shown in FIG. 1.

First, an explanation will be made of the configuration of the data recording and reproducing apparatus 1 and the operation of the respective constituent elements.

As shown in FIG. 1, the data recording and reproducing apparatus 1 is constituted by a VTR portion 10, a video interface circuit (video IF circuit) 24, an MO disc portion 30, a data transfer circuit 40, a digital interface circuit (digital IF circuit) 44, and a control circuit (CPU) 50.

Note that the constituent parts of the data recording and reproducing apparatus 1 are integrally accommodated in one housing 5 so as to give convenience in carrying and handling.

The VTR portion 10 is constituted by a VTR device 12, a REC amplifier (record/playback: REC/PB amplifier) 14, a channel modulation and decoding circuit (channel code ENDEC) 16, and an error correction code generating/error correction circuit (ECC circuit) 18.

The MO disc portion 30 is constituted by an MO disc device 32, a laser control circuit 34, a channel modulation and decoding circuit 36, and an ECC circuit 38.

Note that, in actuality, due to the control by the control circuit 50, the constituent elements of the VTR portion 10 and the MO disc portion 30 and the control circuit 50 are connected by control signal lines, but these are omitted for simplification of the illustration.

In the VTR portion 10, the VTR device 12 performs the recording and reproduction of audio and/or visual data including audio-data and video-data, audio-data, or video data, i.e. audio and/or video data of a digital format with respect to the video tape 110. The VTR portion 10 has two operation modes of, for example, normal recording and reproduction and high speed recording and reproduction, and outputs the audio and/or visual data at two recording and reproduction rates corresponding to the operation modes.

Where the reproduction data rate is changed and the audio and/or visual data is reproduced from the video tape 110, the speed of feeding the video tape 110 and the rotational speed of the recording and reproduction head are changed. Further, as shown in FIG. 2, it is sufficient so far as the VTR device 12 is controlled so that a combined vector c of a vector a expressing the speed of advance of the video tape 110 and a vector b indicating the path of the recording and reproduction head where the video tape 110 is stopped follows the recording track $112_i$ of the video tape 110.

The REC amplifier 14 drives the recording head of the VTR device 12 when recording digital audio and/or visual data on the video tape 110 and amplifies the reproduction signal from the VTR device 12 when reproducing audio and/or visual data from the video tape 110.

The channel modulation and decoding circuit 16 matches the characteristic of the recording and reproduction system (not illustrated) of the VTR device 12 and the characteristic of the audio and/or visual data input and output between the ECC circuit 18 and the channel modulation and decoding circuit 16 so as to make efficient recording and reproduction possible.

The ECC circuit 18 adds the error correction code (ECC) to the audio and/or visual data input from the signal processor 20 and performs the error correction thereof by using the ECC contained in the audio and/or visual data input from the channel modulation and decoding circuit 16.

The signal processor 20 has a switching circuit, an analog/digital conversion circuit, and a digital/analog conversion circuit, etc., converts the digital audio and/or visual data input from the ECC circuit 18 or the data transfer circuit 40 to an analog audio and/or visual signal and outputs the same to the video IF circuit 24, and converts an analog audio and/or visual signal input from the video IF circuit 24 to digital audio and/or visual data and outputs the same to the ECC circuit 18 or the data transfer circuit 40.

The video IF circuit 24 outputs the audio and/or visual image signal (AOUT) input from the signal processor 20 to an outside apparatus and outputs the audio and/or visual signal (AIN) input from an outside apparatus to the signal processor 20.

In the MO disc portion 30, the MO disc device 32 performs the recording and reproduction of the digital audio and/or visual data with respect to the MO disc 300.

The laser control circuit 34 controls the output of the laser diode (not illustrated) of the optical system 320 of the MO disc device 32.

The channel modulation and decoding circuit 36 matches the characteristic of the optical system 320 of the MO disc device 32 and the characteristic of the audio and/or visual data input and output between the ECC circuit 38 and the channel modulation and decoding circuit 36 so as to make efficient recording and reproduction possible.

The ECC circuit 38 adds the error correction code (ECC) to the audio and/or visual data input from the data transfer circuit 40 and performs the error correction thereof by using the ECC contained in the audio and/or visual data input from the channel modulation and decoding circuit 36.

The data transfer circuit 40 performs the buffering of the audio and/or visual data input from the signal processor 20 or the ECC circuit 38 and outputs the same to the signal processor 20, ECC circuit 38, or the digital IF circuit 44.

That is, the data transfer circuit 40 transfers the audio and/or visual data reproduced by the VTR device 12 to the MO disc device 32, the video IF circuit 24, and the digital IF circuit 44 according to the control of the control circuit 50 based on the operation data and transfers the audio and/or visual data reproduced by the MO disc device 32 to the VTR device 12, the video IF circuit 24, and the digital IF circuit 44.

The digital IF circuit 44 outputs the audio and/or visual data input from an outside apparatus to the data transfer circuit 40 at a designated transmission data rate (DOUT) and outputs audio and/or visual data (DIN) input from an outside apparatus to the data transfer circuit 40 at a designated transmission data rate.

The control circuit 50 controls the operation of the constituent elements of the data recording and reproducing apparatus 1 according to the operation information input from an outside apparatus. Also, as explained referring to the first embodiment, where a buffer memory is used in place of the data transfer circuit 40, the control circuit 50 monitors the empty storage capacity of this buffer memory and controls the recording and reproduction operation etc. of the VTR device 12 and the MO disc device 32 so that an overflow will not occur.

Note that, in the data recording and reproducing apparatus 1, the MO disc device 32 corresponds to the disc recording and reproducing means according to the present invention; the MO disc 300 corresponds to the disc recording medium according to the present invention; the VTR device 12 corresponds to the tape recording and reproducing means according to the present invention; the video tape 110 corresponds to the tape recording medium according to the present invention; the signal processor 20 and the data transfer circuit 40 correspond to the data transfer means according to the present invention; and the video IF circuit 24 and the digital IF circuit 44 respectively correspond to the first input/output means and second input/output means according to the present invention.

Below, the operation of the data recording and reproducing apparatus 1 will be explained.

The video IF circuit 24 of the data recording and reproducing apparatus 1 has connected to it, for example, a video camera which inputs the analog audio and/or visual image signal to the data recording and reproducing apparatus 1 and a monitor device (not illustrated) which displays the audio and/or visual data output from the data recording and reproducing apparatus 1. The digital IF circuit 44 has connected to it, for example, a communication line through which the audio and/or visual data is transmitted at the predetermined transmission data rate or the transmission device. The control circuit 50 receives as input operation information from the operator of the data recording and reproducing apparatus 1.

The analog audio and/or visual signal is sequentially input to the video IF circuit 24 from the video camera connected to the data recording and reproducing apparatus 1.

According to the control of the control circuit 50, the audio and/or visual signal input to the video IF circuit 24 is converted to digital audio and/or visual data, the data is subjected to predetermined processing by the signal processor 20, the ECC is added by the ECC circuit 18, and the result is input to the VTR device 12 via the channel modulation and decoding circuit 16 and the REC amplifier 14. In the VTR device, recording is carried out on the inserted video tape 110 at the recording data rate of normal recording and reproduction.

When the input of the audio and/or visual image signal is ended, the operator of the data recording and reproducing apparatus 1 makes the VTR device 12 reproduce the audio and/or visual data at the reproduction data rate of high speed recording and reproduction and, at the same time, inputs operation information indicating that the audio and/or visual data reproduced by the VTR device 12 has been recorded at the recording data rate of the high speed recording and reproduction to the MO disc device 32.

The control circuit 50 controls the constituent parts of the data recording and reproducing apparatus 1 according to this operation information.

The VTR device 12 reproduces the audio and/or visual data from the video tape 110 at the transfer data rate of the high speed recording and reproduction and outputs the same to the ECC circuit 18 via the REC amplifier 14 and the channel modulation and decoding circuit 16.

The ECC circuit 18 sequentially corrects the error of the input audio and/or visual data, and the signal processor 20 makes the data transfer circuit 40 sequentially store the audio and/or visual data after the error correction.

Here, for example, where a buffer memory is used instead of the data transfer circuit as mentioned above, the control circuit 50 monitors the remaining recording capacity of the data transfer circuit and controls the VTR device 12 to stop the reproduction of the audio and/or visual data where the remaining recording capacity becomes a predetermined value or less and restart the reproduction of the data of the VTR device 12 where the remaining recording capacity becomes larger than a predetermined value.

The ECC circuit 38 adds the ECC to the audio and/or visual data stored in the data transfer circuit. The audio and/or visual data to which the ECC was added is input via the channel modulation and decoding circuit 36 and the laser control circuit 34 to the MO disc device 32 and sequentially recorded on the MO disc 300.

Below, an explanation will be made of the method of editing of the audio and/or visual data using the data recording and reproducing apparatus 1.

When the above operation is ended, the operator of the data recording and reproducing apparatus 1 inputs operation information designating a reproduction position of the MO disc 300.

The MO disc device 32 reproduces the audio and/or visual data at the position on the MO disc 202 which was designated and outputs the same to the ECC circuit 38 via the laser control circuit 34 and the channel modulation and decoding circuit 36.

The ECC circuit 38 corrects the error of the input audio and/or visual data. The error-corrected audio and/or visual data is sequentially stored in the data transfer circuit.

The control circuit 50 monitors the remaining storage capacity of the data transfer circuit in the same way as the case where the audio and/or visual data is input from the signal processor 20 to the data transfer circuit and controls the MO disc device 32 to stop the reproduction of the audio and/or visual data where the remaining recording capacity becomes a predetermined value or less and restarts the reproduction of the data of the MO disc device 32 where the remaining recording capacity becomes larger than a predetermined value.

The digital IF circuit 44 sequentially reads out the audio and/or visual data from the data transfer circuit and displays the same on the monitor device.

The operator of the data recording and reproducing apparatus 1 repeatedly designates reproduction positions and confirms the video images on the monitor device to find the necessary video images and makes the VTR device 12 record the found audio and/or visual data on the video tape 110 at the recording data rate of the high speed recording and reproduction so as to perform the editing work.

Note that, in this case, when the reproduction speed of the MO disc device 32 is made faster than the recording speed of the VTR device 12, the audio and/or visual data which is input to the MO disc device 32 is not interrupted, therefore this is preferable.

Also, as another method of editing, a method may be adopted wherein the operator inputs operation information designating an order of reproduction of the recorded audio and/or visual data and a range thereof to the MO disc 300, the MO disc device 32 reproduces the audio and/or visual data from the MO disc 300 according to this operation information, and the VTR device 12 records this audio and/or visual data.

There are cases where the video data obtained by the above editing work is carried to the broadcast station via the video tape 110 and cases where the video data is transmitted to the broadcast station etc. via a communication line.

Below, an explanation will be made of the operation of the data recording and reproducing apparatus 1 when a transmission device is connected to the digital IF circuit 44 and the audio and/or visual data is transmitted.

The operator performs the above-mentioned operation to move the edited audio and/or visual data from the video tape 110 to the MO disc 300 in the data recording and reproducing apparatus 1.

Further, the operator inputs the operation information for transmitting the audio and/or visual data from the digital IF circuit 44 to the data recording and reproducing apparatus 1.

The MO disc device 32 reads out the recording signal from the MO disc 300 and outputs the same to the laser control circuit 34. The reproduced recording signal is input to the data transfer circuit via the laser control circuit 34, the channel modulation and decoding circuit 36, and the ECC circuit 38 and stored.

The digital IF circuit 44 sequentially outputs the audio and/or visual data input from the data transfer circuit 40 at a transmission data rate suited to the connected transmission device.

Also at this time, the control circuit 50 controls the reproduction of the audio and/or visual data of the MO disc device 32 so as not to allow overflow etc. in the data transfer circuit (buffer memory) 40.

As mentioned above, according to the data recording and reproducing apparatus 1, the VTR device 12 and the MO disc device 32 are integrally constituted, and therefore it is possible to perform the editing work by using only the data recording and reproducing apparatus 1. Accordingly, editing of the audio and/or visual data can be easily carried out at the camera site.

Also, in the data recording and reproducing apparatus 1, even if the VTR device 12 is not constituted so that reproduction at any reproduction data rate is possible, the digital audio and/or visual data can be transmitted in accordance with the transmission data rate. Accordingly, a VTR device having a general configuration can be used as the VTR device 12 used in the data recording and reproducing apparatus 1.

Also, since it is possible to perform the data transfer between the video tape 110 and the MO disc 300 at a high speed during the editing work, the efficiency of the editing work rises.

Note that the VTR device 12 was constituted so as to record and reproduce audio and/or visual data at two types of recording and reproduction data rates, but it is also possible to further increase the type of the recording and reproduction data rates of the VTR device 12.

Moreover, it is also possible to constitute the data recording and reproducing apparatus 1 so as to use another random accessable recording device, for example, an HD device, in place of the MO disc device 32.

Further, it is also possible to omit part of the constituent elements of the data recording and reproducing apparatus 1 in accordance with the purpose of the data recording and reproducing apparatus 1 or to further add constituent elements having other functions.

Also, it does not suffer from the disadvantage if the constituent elements of the data recording and reproducing apparatus 1 are realized by hardware means or realized by software means.

Moreover, it is also possible to include a monitor device in the housing 5 in the data recording and reproducing apparatus 1 and constitute the data recording and reproducing apparatus 1 so that the audio and/or visual data reproduced by the VTR recording and reproducing device 12 and the MO disc recording and reproducing device 32 or the audio and/or visual data received by the video IF circuit 24 and the digital IF circuit 44 can be displayed to the user.

In addition to the explanation in the first embodiment, the data recording and reproducing apparatus of the present invention can adopt various configurations as in for example the modifications mentioned here.

Second Embodiment

In the second embodiment, a further detailed configuration and operation of the data recording and reproducing apparatus 1 shown in FIG. 1 as the first embodiment will be explained.

Figure 3:
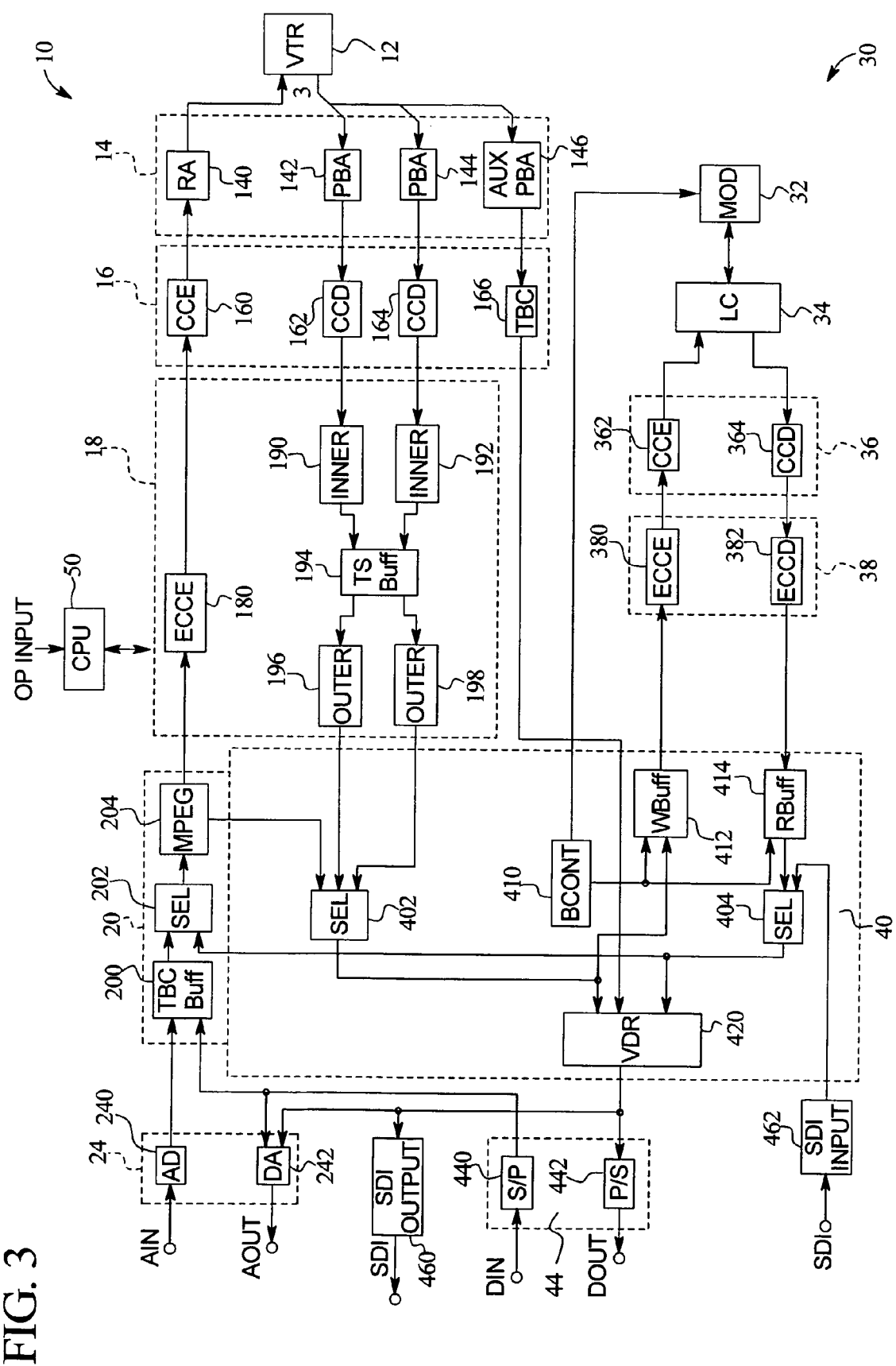
FIG. 3 is a view showing a detailed configuration of the data recording and reproducing apparatus according to the present invention shown in FIG. 1.

FIG. 3 is a view showing a detailed configuration of the data recording and reproducing apparatus 1 according to the present invention shown in FIG. 1. Note that, in FIG. 3, the same constituent parts as those of FIG. 1 are indicated by the same references.

As shown in FIG. 3, the video IF circuit 24 is constituted by an A/D conversion circuit 240 and a D/A conversion circuit 242.

The A/D conversion circuit 240 converts the audio-video signal AIN of an analog format supplied from an editing device of an outside apparatus, camera, etc. to audio and/or visual data of a digital format and outputs the same to the signal processor 20.

The D/A conversion circuit 242 converts audio and/or visual data of a digital format input from the signal processor 20 to an audio and/or visual image signal AOUT of an analog format and outputs the same to an editing device connected to an outside apparatus and a monitor device (not illustrated) etc.

The digital IF circuit 44 is constituted by a serial/parallel conversion circuit (S/P conversion circuit) 440 and a parallel/serial conversion circuit (P/S conversion circuit).

The S/P conversion circuit 440 receives audio and/or visual data DIN of a serial format which is input from a communication line, converts the same to a parallel format, and outputs it to the signal processor 20.

The P/S conversion circuit 442 converts audio and/or visual data of a parallel format input from the signal processor 20 to audio and/or visual data DOUT of a serial format and transmits the same onto the communication line.

The signal processor 20 is constituted by a TBC (time base corrector) buffer circuit 200, a selector circuit (SEL) 202, and an MPEG processing circuit 204.

The TBC buffer circuit 200 performs the buffering of the audio and/or visual data synchronized to a clock signal including jitter, which was input from the video IF circuit 24 and the digital IF circuit 44, synchronizes the same with the normal clock signal, and outputs the resultant signal to the selector circuit 202.

The selector circuit 202 selects either of the audio and/or visual data input from the TBC buffer circuit 200 and the selector circuit 404 according to the control of the control circuit 50 and outputs the selected signal to the MPEG processing circuit 204.

The MPEG processing circuit 204 processes the audio and/or visual data input from the selector circuit 202 according to need according to the control of the control circuit 50. That is, where non-compressed audio and/or visual data is input, this non-compressed audio and/or visual data is subjected to compression and encoding processing by a compression and encoding system such as for example an MPEG 2 system and where compressed audio and/or visual data is input, this compressed audio and/or visual data is subjected to expansion and decoding processing.

The audio and/or visual data processed by the selector circuit 202 is output to the selector circuit 402 and an ECC encoder 180 of the ECC circuit 18.

The ECC circuit 18 is constituted by the ECC encoder (ECCE) 180, inner code processing circuits (INNER) 190 and 192, a TS buffer circuit (TSBuff) 194, and outer code processing circuits (OUTER) 196 and 198.

The ECC encoder 180 adds the inner code and outer code to the audio and/or visual data input from the MPEG processing circuit 204 of the signal processor 20 and outputs the resultant signal to the inner code processing circuit 190.

The inner code processing circuits 190 and 192 perform the error correction by using the inner code added to the audio and/or visual data which was reproduced from the video tape 110 by the VTR device 12 and channel code-decoded by the channel modulation and decoding circuit 16 and outputs the resultant signal to the TS buffer circuit 194.

The TS buffer circuit 194 performs the buffering of the audio and/or visual data whose error was corrected by the inner code processing circuits 190 and 192 and outputs the resultant signals to the outer code processing circuits 196 and 198.

The outer code processing circuit 196 performs the error correction by using the outer code added to the audio and/or visual data input from the TS buffer circuit 194 and outputs the resultant signal to the data transfer circuit.

The channel modulation and decoding circuit 16 is constituted by a channel code encoder circuit (CCE circuit) 160, channel code decoder circuits (CCD circuits) 162 and 164, and a TBC circuit 166.

The CCE circuit 160 modulates the audio and/or visual data input from the ECC encoder 180 of the ECC circuit 18 to produce the recording signal and outputs the resultant signal to the REC amplifier 14.

The CCD circuits 162 and 164 demodulate the recording signal which was reproduced by the VTR device 12 and amplified by the REC amplifier 14 to produce the audio and/or visual data and outputs the same to the inner code processing circuits 190 and 192 of the ECC circuit 18.

The TBC circuit 166 performs jitter compensation of the recording signal input from the REC amplifier 14 in the same way as the TBC buffer circuit 200 and outputs the resultant signal to the data transfer circuit 40.

The REC amplifier 14 is constituted by a recording amplifier (RA) 140 and a reproduction amplifier (PBA, AUXPBA).

The recording amplifier 140 amplifies the recording signal input from the CCE circuit 160 of the channel modulation and decoding circuit 16 and outputs the amplified signal to the VTR device 12.

The reproduction amplifiers 142, 144, and 146 respectively amplify the recording signal reproduced by the VTR device 12 and output the amplified signals to the CCD circuits 162 and 164 of the channel modulation and decoding circuit 16 and the TBC circuit 166.

Note that, the REC amplifier 14 of the data recording and reproducing apparatus 1 and the channel modulation and decoding circuit 16 provide three systems of circuits, that is, a digital system circuit, an analog system circuit, and an AUX series, as the circuits for reproduction. That is, for example, as the inner code processing circuit 190 and the outer code processing circuit 196 of the ECC circuit 18, the CCD circuit 162 of the channel modulation and decoding circuit 16 and the reproduction amplifier 142 of the REC amplifier 14 are used as the digital system circuit; the inner code processing circuit 192 and the outer code processing circuit 198 of the ECC circuit 18, the CCD circuit 164 of the channel modulation and decoding circuit 16, and the reproduction amplifier 144 of the REC amplifier 14 are used as the analog system circuit; and the reproduction amplifier 146 of the REC amplifier 14 and the TBC circuit 166 of the channel modulation and decoding circuit 16 are used as the AUX circuit.

The reason that the REC amplifier 14 and the channel modulation and decoding circuit 16 provide both a digital system circuit and an analog system circuit is to prepare for the case where an audio and/or visual-image signal of an analog format is recorded on the video tape 110 in addition to the recording of the audio and/or visual data of the digital format on the video tape 110.

Also, the AUX circuit is used for reproducing the auxiliary data (AUX data) recorded on the video tape 110 together with the audio and/or visual data (recording signal).

The ECC circuit 38 is constituted by an ECC encoder (ECCE) 380 and an ECC (ECCD) decoder 382.

The ECC encoder 380 adds the ECC to the audio and/or visual data input from the data transfer circuit 40 and outputs the resultant data to the channel modulation and decoding circuit 36.

The ECC decoder 382 performs error correction by using the ECC contained in the audio and/or visual data reproduced by the MO disc device 32 and demodulated by the channel modulation and decoding circuit 36 and outputs the resultant signal to the data transfer circuit 40.

The channel modulation and decoding circuit 36 is constituted by a CCE circuit 362 and a CCD circuit 364.

The CCE circuit 362 modulates the audio and/or visual data input from the ECC encoder 380 of the ECC circuit 38 to produce the recording signal and outputs the same to the laser control circuit 34.

The CCD circuit 364 demodulates the recording signal which is input from the laser control circuit 34 and outputs the demodulated signal to the ECC decoder 382 of the ECC circuit 38.

The data transfer circuit 40 is constituted by selector circuits 402 and 404, a buffer control circuit (BCONT) 410, a recording buffer circuit (Wbuff) 412, a reproduction buffer circuit (RBuff) 414, and a video processor circuit (VPR) 420.

The selector circuit 402 selects either of the audio and/or visual data input from the MPEG processing circuit 204 or the outer code processing circuits 196 and 198 of the ECC circuit 18 according to the control of the control circuit 50 and outputs the selected signal to the video processor circuit 420 and the recording buffer circuit 412.

The selector circuit 404 selects either of the audio and/or visual data input from the SDI input circuit 462 or the reproduction buffer circuit 414 according to the control of the control circuit 50 and outputs the selected signal to the selector circuit 202 and the video processor circuit 420.

The recording buffer circuit 412 performs the buffering of the audio and/or visual data input from the selector circuit 402 and outputs the resultant data to the ECC encoder 380 of the ECC circuit 38.

The reproduction buffer circuit 414 performs the buffering of the audio and/or visual data input from the ECC decoder 382 of the ECC circuit 38 and outputs the resultant data to the selector circuit 404.

The buffer control circuit 410 monitors the remaining recording capacity of the recording buffer circuit 412 and the reproduction buffer circuit 414 when the MO disc device 32 records and reproduces the audio and/or visual data and controls the reproduction operation and recording operation of the MO disc device 32 so that the recording buffer circuit 412 and the reproduction buffer circuit 414 will not overflow.

The video processor circuit 420 performs predetermined processing with respect to the audio and/or visual data input from the selector circuit 402, the TBC circuit 166 of the channel modulation and decoding circuit 16, and the selector circuit 404, for example processing relating to the adjustment of the signal level, superimpose processing, and character insertion processing, and outputs the resultant signal to the D/A conversion circuit 242 of the video IF circuit 24, the P/S conversion circuit 442 of the digital IF circuit 44, and the SDI output circuit 460.

The SDI output circuit 460 improves on the SDI (serial data interface: SMPTE-259M) system or SDI system for the audio and/or visual data input from the video processor 420 according to the control of the control circuit 50 and transmits the resultant audio and/or visual data to a transmission path of an SDDI (serial digital data interface) system through which the transmission of the audio and/or visual data subjected to the variable length compression and encoding was made possible.

The SDI input circuit 462 receives the audio and/or visual data transmitted via the transmission path of the SDI system etc. and outputs the same to the selector circuit 404.

FIG. 4 is a view showing the control of operation of the MO disc device 32 by the buffer control circuit 410 shown in FIG. 3.

Figure 4A:
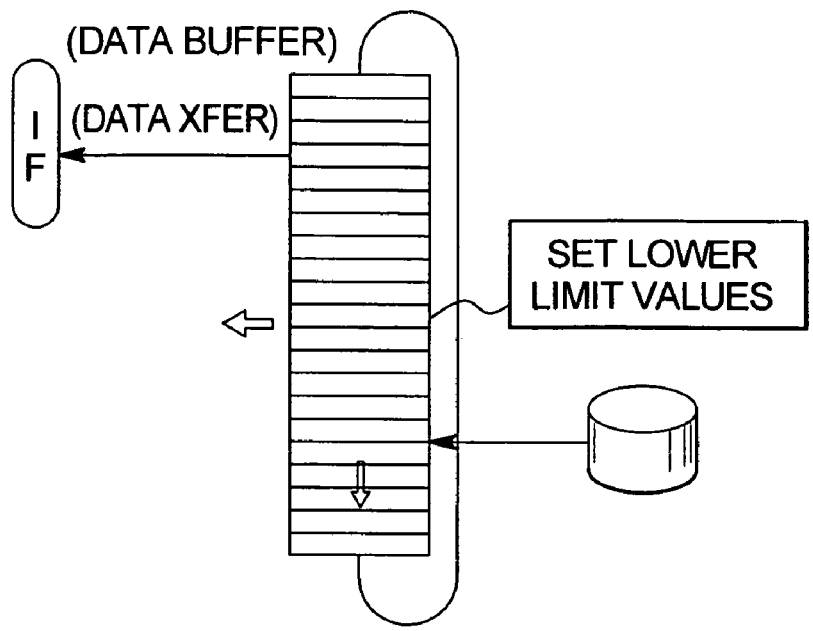
FIGS. 4A and 4B are views showing control of an operation of an MO disc device by a buffer control circuit shown in FIG. 3.
Figure 4B:
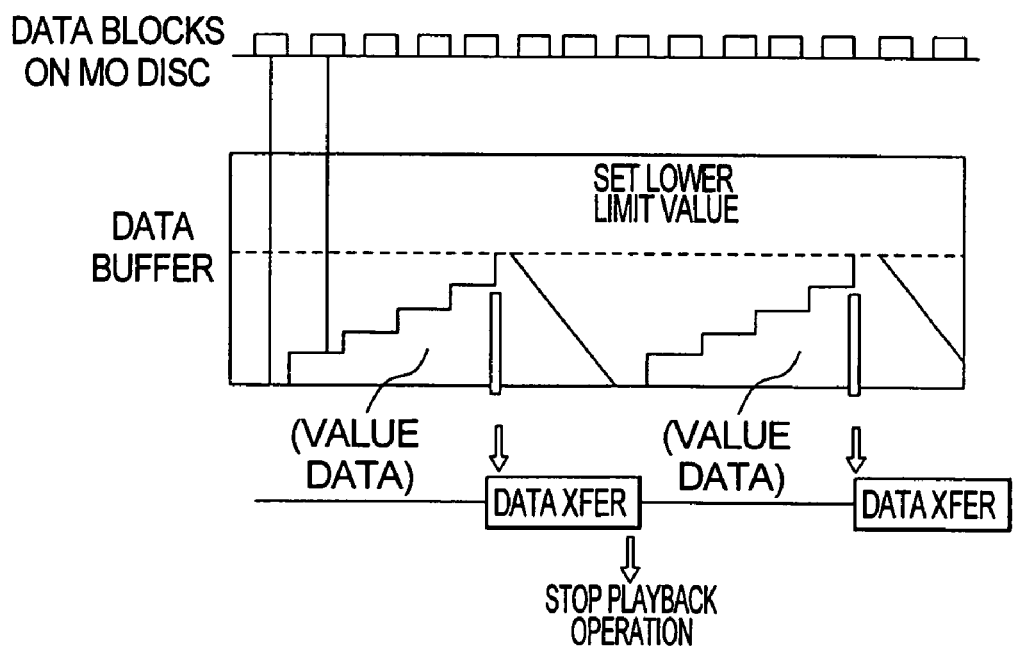

As shown in FIGS. 4A and 4B, the buffer control circuit 410 starts the reproduction operation of the MO disc device 32 (reproduction operation starting processing) where the remaining recording capacity of the reproduction buffer circuit 414 becomes a predetermined lower limit setting or less when the MO disc device 32 performs the reproduction operation and stops the reproduction operation of the MO disc device 32 (reproduction operation stopping processing) where the remaining storage capacity becomes a predetermined upper limit setting or more.

Also, the buffer control circuit 410 starts the reproduction operation of the MO disc device 32 where the remaining recording capacity of the recording buffer circuit 412 becomes a predetermined lower limit setting or less when the MO disc device 32 performs the recording operation and stops the reproduction operation of the MO disc device 32 where the remaining storage capacity becomes a predetermined upper limit setting or more. In this way, the buffer control circuit 410 prevents overflow from occurring in at least the recording buffer circuit 412 and the reproduction buffer circuit 414.

Note that, it is also possible to constitute the apparatus so that the buffer control circuit 410 further monitors the amount of the audio and/or visual data stored in the reproduction buffer circuit 414 and the recording buffer circuit 412 and controls the MO disc device 32 so as to hold the amount to a predetermined value or more to prevents an underflow.

Figure 5:
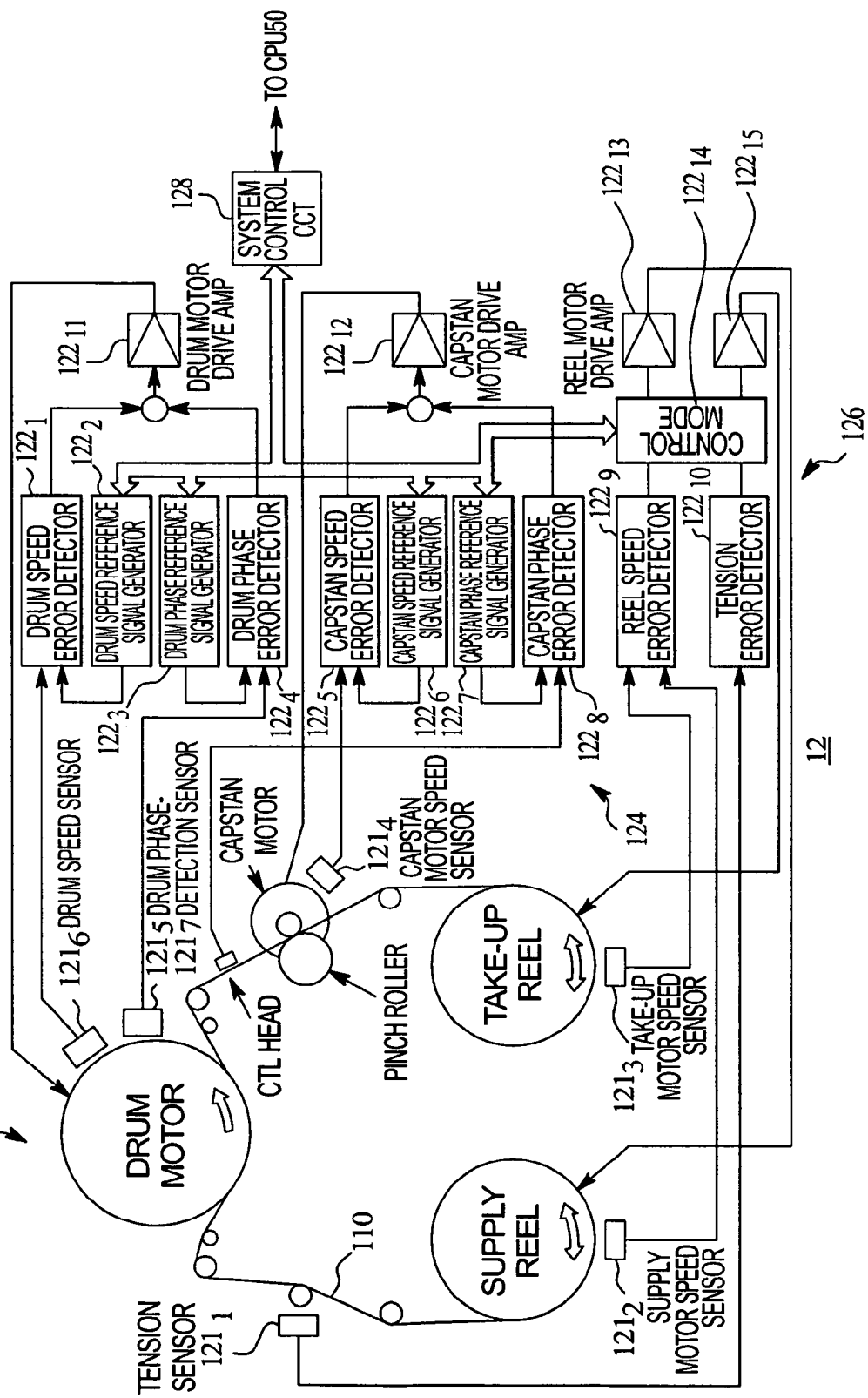
FIG. 5 is a view showing the configuration of a tape running system of the VTR device shown in FIG. 1 and FIG. 3.

FIG. 5 is a view showing the configuration of the tape running system of the VTR device 12 shown in FIG. 1 and FIG. 3.

As shown in FIG. 5, the tape running system of the VTR device 12 is constituted by a mechanical system 120, a drum control system 122, a capstan driving system 124, a reel motor driving system 126, and a system control circuit 128.

The mechanical system 120 is constituted by a drum motor, a feed (supply) side reel, a rewinding (take-up) side reel, a capstan motor, a pinch roller, and a control (CTL) head.

The mechanical system 120 is driven by the drum control system 122, the capstan driving system 124, and the reel motor driving system 126, feeds out the video tape 110, and makes the video tape run on the side surface of the drum on which the recording head and the reproduction head are arranged.

The drum control system 122 is constituted by a drum speed detection sensor, a drum phase detection sensor, a drum speed error detection circuit, a drum speed reference signal generation circuit, a drum phase error detection circuit, and a drum motor driving amplifier and controls the rotation of the drum.

The capstan driving system 124 is constituted by a capstan speed detection sensor, a capstan phase detection sensor, a capstan speed error detection circuit, a capstan speed reference signal generation circuit, a capstan phase error detection and a capstan motor driving amplifier and controls the rotation of the capstan.

The reel motor driving system 126 is constituted by two reel motor speed detection sensors, a reel speed error detection circuit, a tension sensor, a tension error detection circuit, a mode control circuit, and a reel motor driving amplifier and controls the rotation of the reel motor.

The system control circuit 128 synchronizes the operations of the drum control system 122, the capstan driving system 124, and the reel motor driving system 126 according to the control of the control circuit 50 (FIG. 1 and FIG. 3) and performs control so that the rotations of the drum motor of the mechanical system 120, the capstan, and the reel motor are always synchronized.

The system control circuit 128 makes the drum control system 122, the capstan driving system 124, and the reel motor driving system 126 operate in synchronization, whereby even in a case where the rotational speeds of the drum motor, capstan, and reel motor are changed, the relationship between the feed of the video tape 110 and the rotational speed of the drum can be held constant, and as shown in FIG. 2, the track on the video tape 110 can be followed.

Figure 6:
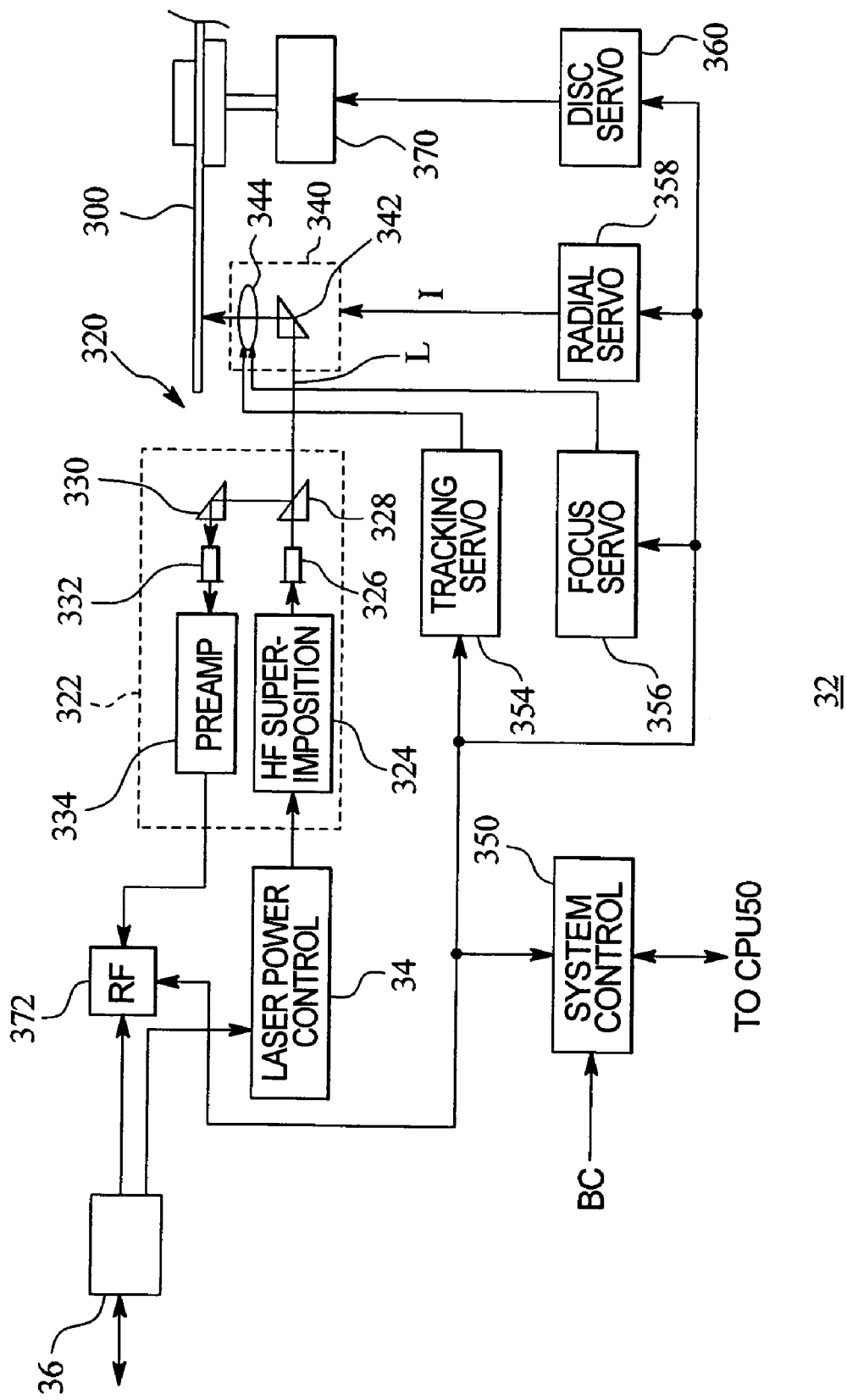
FIG. 6 is a view showing the configuration of the MO disc device shown in FIG. 1 and FIG. 3.

FIG. 6 is a view showing the configuration of the MO disc device 32 shown in FIG. 1 and FIG. 3.

As shown in FIG. 6, the MO disc device 32 is constituted by an optical system 320, a system control circuit 350, a tracking servo circuit 354, a focus servo circuit 356, a radial servo circuit 358, a disc servo circuit 360, and a spindle motor 370.

The optical system 320 is constituted by a fixed portion 322 and a movable portion 340.

The fixed portion 322 is constituted by an HF superimposing circuit 324, a laser diode 326, prisms 328 and 330, a photodiode 332, and a preamplifier 334.

The movable portion 340 is constituted by a prism 342 and a lens system 344.

The system control circuit 350 controls the operation of the constituent parts of the MO disc device 32 according to an operation control signal BC input from the buffer control circuit 410 and the control from the control circuit 50.

Where the audio and/or visual data is recorded on the MO disc 300, the recording signal is input from the channel modulation and decoding circuit 36 to the laser control circuit 34. The laser control circuit 34 produces a drive signal for driving the laser diode 326 based on the recording signal.

The HF superimposing circuit 324 superimposes the high frequency signal (HF) on the drive signal, and the laser diode 326 irradiates the laser beam on which the high frequency signal is superimposed to the MO disc 300 via the movable portion 340 to record the recording signal (audio and/or visual data) on the MO disc 300.

Where audio and/or visual data is reproduced from the MO disc 300, the laser control circuit 34 produces a drive signal for generating a laser beam for reproduction.

The HF superimposing circuit 324 superimposes the high frequency signal (HF) on the drive signal, and the laser diode 326 irradiates the laser beam for reproduction to the MO disc 300 via the movable portion 340. The photodiode 332 detects the laser beam containing the recording signal which was reflected at the MO disc 300 and returned via the movable portion 340, converts the same to an electrical RF signal, and outputs the same to the RF circuit 372.

The RF circuit 372 performs the equalization processing etc. with respect to the RF signal and outputs the resultant signal as the recording signal to the channel modulation and decoding circuit 36.

Below, an explanation will be made of the operation of the data recording and reproducing apparatus 1 by paying attention to the route of the audio and/or visual data in the data recording and reproducing apparatus 1 shown in FIG. 3 (signal route).

First Signal Route

The audio and/or visual data which was input to the A/D conversion circuit 240 of the video IF circuit 24 and converted to the digital format is input to the signal processor 20.

The TBC buffer circuit 200 of the signal processor 20 performs the jitter correction of the input audio and/or visual data and outputs the resultant data to the MPEG processing circuit 204 via the selector circuit 202. The MPEG processing circuit 204 compresses and encodes the input audio and/or visual data by the MPEG 2 system and outputs the resultant data to the ECC encoder 180 of the ECC circuit 18.

The ECC encoder 180 of the ECC circuit 18 adds the ECC to the compressed and encoded audio and/or visual data. The audio and/or visual data to which the ECC was added is input to the VTR device 12 via the channel modulation and decoding circuit 16 and the REC amplifier 14 and recorded on the video tape 110.

In this way, the VTR device 12 can record the audio and/or visual data input from the video IF circuit 24.

Second Signal Route

The audio and/or visual data which was input to the signal processor 20 via the S/P conversion circuit 440 of the digital IF circuit 44 and subjected to the predetermined processing is output to the VTR device 12 via the ECC encoder 180 of the ECC circuit 18, the CCE circuit 160 of the channel modulation and decoding circuit 16, and the recording amplifier 140 of the REC amplifier 14 in the same way as the audio and/or visual data input to the A/D conversion circuit 240, which was explained referring to the first signal route.

The VTR device 12 rotates the drum motor, the capstan motor, and the reel motor at a rotational speed in accordance with the transmission data rate of the digital IF circuit 44 according to the control of the control circuit 50 and records the data on the video tape 110.

In this way, the VTR device 12 can record the audio and/or visual data input from the digital IF circuit 44 on the video tape 110 at the same recording data rate as the transmission data rate of the communication line etc. connected to the digital IF circuit.

Third Signal Route

The audio and/or visual data DIN input from the communication line connected to the S/P conversion circuit 440 of the digital IF circuit 44 at the predetermined transmission data rate is input to the D/A conversion circuit 242 of the video IF circuit 24 after passing through the signal processor 20.

The D/A conversion circuit 242 converts the input audio and/or visual data to an audio and/or visual signal of the analog format and displays the same on for example the monitor device connected to the D/A conversion circuit 242.

In this way, the audio and/or visual data DIN input to the S/P conversion circuit 440 is converted to the audio and/or visual data AOUT by the D/A conversion circuit 242 and output and displayed on the device etc., whereby monitoring of the audio and/or visual signal transmitted via the communication line or monitoring of the camera become possible.

Fourth Signal Route

The VTR device 12 rotates the drum motor, the capstan motor, and the reel motor in accordance with the required reproduction data rate according to the control of the control circuit 50 and reproduces the recording signal from the video tape 110. Further, the VTR device 12 outputs the reproduced recording signal to either of the reproduction amplifier 142 or 144 of the REC amplifier 14.

The recording signal amplified at the REC amplifier 14 is regarded as audio and/or visual data by either of the CCD circuit 162 or 164 of the channel modulation and decoding circuit 16, subjected to buffering processing as shown in FIG. 4 by the selector circuit 402 of the data transfer circuit 40, the recording buffer circuit 412, and the buffer control circuit 410, and output to the ECC circuit 38.

The ECC encoder 380 of the ECC circuit 38 adds the ECC to the input audio and/or visual data, which is modulated by the CCE circuit 362 of the channel modulation and decoding circuit 36, and output it as the recording signal to the MO disc device 32. The MO disc device 32 records the input recording signal on the MO disc 300.

In this way, the MO disc device 32 can record the audio and/or visual data reproduced from the video tape 110 by the VTR device 12 on the MO disc 300.

Fifth Signal Route

The MO disc device 32 reproduces the recording signal from the MO disc 300 and outputs the reproduced signal to the CCD circuit 364 of the channel modulation and decoding circuit 36 via the laser control circuit 34. The CCD circuit 364 demodulates the audio and/or visual data from the recording signal, and the ECC decoder 382 of the ECC circuit 38 performs the error correction processing with respect to the audio and/or visual data and outputs the resultant signal to the reproduction buffer circuit 414 of the data transfer circuit 40.

The buffer control circuit 410 and the reproduction buffer circuit 414 perform the buffering processing for the input audio and/or visual data as shown in FIG. 4 and output the same to the P/S conversion circuit 442 of the digital IF circuit 44 via the selector circuit 404 and the video processor circuit 420. The P/S conversion circuit 442 outputs the audio and/or visual data DOUT to the connected communication line.

At this time, the buffer control circuit 410 of the data transfer circuit 40 controls also the operation of the MO disc device 32 as shown in FIG. 4 to make the same to perform the reproduction operation in accordance with the transmission data rate for output to the outside apparatus.

In this way, the audio and/or visual data reproduced by the MO data recording and reproducing device 32 can be transmitted to the communication line connected to the P/S conversion circuit 442 of the digital IF circuit 44.

Sixth Signal Route

The MO disc device 32 reproduces the recording signal from the MO disc 300 and outputs the reproduced signal to the channel modulation and decoding circuit 36 via the laser control circuit 34.

The CCD circuit 364 of the channel modulation and decoding circuit 36 demodulates the audio and/or visual data from the recording signal and outputs the resultant signal to the reproduction buffer circuit 414 of the data transfer circuit 40 via the ECC circuit 38 and the ECC decoder 382.

The buffer control circuit 410 and the reproduction buffer circuit 414 perform the buffering processing for the input audio and/or visual data as shown in FIG. 4 and outputs the resultant signal to the ECC encoder 180 of the ECC circuit 18 via the selector circuit 202 of the signal processor 20 and the MPEG processing circuit 204.

The ECC encoder 180 adds the ECC to the audio and/or visual data and outputs the resultant data to the VTR device 12 via the CCE circuit 160 of the channel modulation and decoding circuit 16 and the recording amplifier 140 of the REC amplifier 14.

The VTR device 12 rotates the drum motor, capstan motor, and reel motor at the rotational speed in accordance with the required recording data rate according to the control of the control circuit 50 and records the audio and/or visual data on the video tape 110.

In this way, the VTR device 12 can record the audio and/or visual data reproduced from the MO disc 300 by the MO disc device 32 on the video tape 110.

Seventh Signal Route

The audio and/or visual data which was input to the signal processor 20 via the S/P conversion circuit 440 of the digital IF circuit 44 or the A/D conversion circuit 240 of the video IF circuit 24 and subjected to the predetermined processing is input to the recording buffer circuit 412.

The buffer control circuit 410 and the recording buffer circuit 412 perform the buffering processing shown in FIG. 4 with respect to the input audio and/or visual data and output the resultant data to the CCE circuit 362 of the channel modulation and decoding circuit 36 via the ECC encoder 380 of the ECC circuit 38.

The CCE circuit 362 modulates the input audio and/or visual data to produce the recording signal and outputs the same to the MO disc device 32 via the laser control circuit 34.

The MO disc device 32 records the recording signal input from the laser control circuit 34 on the MO disc 300.

In this way, the MO disc recording and reproducing device 32 can record the audio and/or visual data input from the outside apparatus via the A/D conversion circuit 240 of the video IF circuit 24 or the S/P conversion circuit 440 of the digital IF circuit 44 on the MO disc 300.

Note that, the audio and/or visual data output from the video processor circuit 420 can be transmitted also to the transmission path of the SDI system via the SDI input circuit 462.

Moreover, also the audio and/or visual data input from the transmission path of the SDI system etc. via the SDI input circuit 462 is recorded by the VTR device 12 and the MO disc device 32 or can be output from the D/A conversion circuit 242 and the P/S conversion circuit 442.

As mentioned above, by giving the configuration as shown in FIG. 3 to the data recording and reproducing apparatus 1 according to the present invention, the input/output and recording and reproduction of the audio and/or visual data can be carried out at any data rate among any elements selected from among the VTR device 12, the MO disc device 32, and the outside apparatus (communication line, monitor device, the transmission path of the SDI system, etc.).

As mentioned above, according to the data recording and reproducing apparatus according to the present invention, a plurality of VTR devices are not required in the editing work of the audio-video data and the audio-video data can be easily edited at the camera site.

Also, the data recording and reproducing apparatus of the present invention has a simple configuration and is low in cost even though it has a variable recording and reproduction data rate and transmission data rate.

Also, according to the data recording and reproducing apparatus of the present invention, it is possible to enhance the efficiency of the editing work by improving the transfer data rate when a plurality of audio and/or visual data are connected to one audio and/or visual data.

Also, the data recording and reproducing apparatus of the present invention can transmit the audio and/or visual data obtained as a result of editing at a plurality of transmission data rates and has little restriction in the method of transmission.

What is claimed is:

1. A data recording and reproducing apparatus comprising:
   a data transfer means;
   a first input/out means connected to said data transfer means for receiving a first analog audio-visual signal, converting said first analog audio-visual signal to a digital format, and providing the converted first digital audio-visual signal to the data transfer means, and for receiving digital audio-visual data from said data transfer means, converting said digital audio-visual data to an analog format, and outputting said converted analog audio-visual data as a second analog audio-visual signal;
   a second input/output means connected to said data transfer means for receiving third audio-visual data and providing said third audio-visual data to said data transfer means, and for receiving fourth audio-visual data transferred from said data transfer means and outputting said fourth audio-visual data;
   a tape recording and reproducing means for recording and reproducing either or both of audio data and video data of a digital format, the tape recording and reproducing means being connected to said data transfer means so that data may be transferred from the data transfer means and recorded by the tape recording and reproducing means in a tape recording medium, and audio-visual data reproduced from said tape recording medium by said tape recording and reproducing means may be provided to the data transfer means; and
   a disc recording and reproducing means connected to said data transfer means so that audio-visual data may be transferred from said data transfer means to said disc recording and reproducing means and recorded in a disc recording medium which may be randomly accessed, and so that audio-visual data reproduced from said disc recording medium by disc recording and reproducing means may be provided to the data transfer means;
   said data transfer means including buffer control means for controlling recording and reproduction of said disc recording and reproducing means according to remaining capacity of at least one buffering means for buffering audio-visual data;
   wherein the data transfer means includes an input buffering means performing the buffering of said audio visual data input from said disc recording and reproducing means, an output buffering means performing the buffering of said audio-visual data that is transferred to said disc recording and reproducing means, and a recording and reproducing control means controlling each of the reproducing operation and recording operation of said disc recording and reproducing means in accordance with respective remaining recording capacities of the input buffering means and said output buffering means;
   wherein the data transfer means selectably transfers audio-visual data among any of the tape recording and reproducing means, the disc recording and reproducing means, the first input/output means, and the second input/output means; and
   wherein the disc recording and reproducing means is a magneto-optic disk.

2. A data recording and reproducing apparatus comprising:
   a housing;
   a data transfer means provided in said housing;
   a first input/out means connected to said data transfer means for receiving a first analog audio-visual signal, converting said first analog audio-visual signal to a digital format, and providing the converted first digital audio-visual signal to the data transfer means, and for receiving digital audio-visual data from said data transfer means, converting said digital audio-visual data to an analog format, and outputting said converted analog audio-visual data as a second analog audio-visual signal;
   a second input/output means connected to said data transfer means for receiving third audio-visual data and providing said third audio-visual data to said data transfer means, and for receiving fourth audio-visual data transferred from said data transfer means and outputting said fourth audio-visual data;
   a tape recording and reproducing means provided in said housing for recording and reproducing either or both of audio data and video data of a digital format, the tape recording and reproducing means being connected to said data transfer means so that data may be transferred from the data transfer means and recorded by the tape recording and reproducing means in a tape recording medium, and audio-visual data reproduced from said tape recording medium by said tape recording and reproducing means may be provided to the data transfer means; and a disc recording and reproducing means provided in said housing and connected to said data transfer means so that audio-visual data may be transferred from said data transfer means to said disc recording and reproducing means and recorded in a disc recording medium which may be randomly accessed, and so that audio-visual data reproduced from said disc recording medium by disc recording and reproducing means may be provided to the data transfer means;

said data transfer means including buffer control means for controlling recording and reproduction of said disc recording and reproducing means according to remaining capacity of at least one buffering means for buffering audio-visual data;

wherein the data transfer means includes an input buffering means performing the buffering of said audio visual data input from said disc recording and reproducing means, an output buffering means performing the buffering of said audio-visual data that is transferred to said disc recording and reproducing means, and a recording and reproducing control means controlling each of the reproducing operation and recording operation of said disc recording and reproducing means in accordance with respective remaining recording capacities of the input buffering means and said output buffering means;

wherein the data transfer means selectably transfers audio-visual data among any of the tape recording and reproducing means, the disc recording and reproducing means, the first input/output means, and the second input/output means; and wherein the disc recording and reproducing means is a magneto-optic disk.

* * * * *